United States Patent [19]

Yoshida et al.

[11] Patent Number: 4,476,399

[45] Date of Patent: Oct. 9, 1984

[54] STABILIZED POWER SOURCE PARALLEL OPERATION SYSTEM

[75] Inventors: Masahiro Yoshida; Masahiko Oka, both of Tokyo, Japan

[73] Assignee: Fuji Electric Co., Ltd., Kanagawa, Japan

[21] Appl. No.: 502,056

[22] Filed: Jun. 7, 1983

[30] Foreign Application Priority Data

Jun. 10, 1982 [JP] Japan .............................. 57-98478

[51] Int. Cl.³ ......................... H02J 1/10; H02J 1/04; H02J 3/08

[52] U.S. Cl. ...................................... 307/44; 307/53; 307/60; 307/65; 307/80; 307/64

[58] Field of Search ...................... 307/44, 48, 53, 60, 307/64, 65, 80; 323/312, 315, 316

[56] References Cited

U.S. PATENT DOCUMENTS

| | | | |
|---|---|---|---|
| 3,956,638 | 5/1976 | Ahrens et al. | 307/44 X |
| 4,318,007 | 3/1982 | Rizzi | 307/44 |
| 4,356,403 | 10/1982 | Mohat | 307/60 |
| 4,429,233 | 1/1984 | Kammiller | 307/64 X |

*Primary Examiner*—Harry E. Moose, Jr.
*Assistant Examiner*—Derek S. Jennings
*Attorney, Agent, or Firm*—Sughrue, Mion, Zinn, Macpeak & Seas

[57] ABSTRACT

A stabilized power source parallel operation system in which the composite output current is maintained at a predetermined level even if a plurality of the parallel power sources are deenergized. Each power source has a voltage comparator, a current converter and a current comparator. The outputs of each of the voltage comparators are interconnected by an inter-power source voltage bus so that each of the current comparators compare the same current.

3 Claims, 3 Drawing Figures

STABILIZED POWER SOURCE PARALLEL OPERATION SYSTEM

BACKGROUND OF THE INVENTION

This invention relates to a parallel operation system for stabilized power sources used in industrial applications such as controlling microcomputers.

In general, when a design engineer constructs a power source system by parallel-connecting a plurality of power sources, two significant objects must be satisfied; specifically, reliability of the power supply and an increase in its capacity are desired.

FIG. 1 is a block diagram showing one example of a conventional power source system which is a so-callled "diode matching system".

In FIG. 1, reference numerals 1 and 2 designate power sources which are operated in a parallel mode, and reference characters D1 and D2 designate output matching diodes. These diodes are used to prevent the output current of one of the power sources from flowing into the other of the power sources when the output voltage of one of the power sources is greater than that of the other, respectively.

In the case where two power sources are operated in parallel as described above, the power source which has a greater output voltage (for example, source 1 and of FIG. 1) supplies substantially 100% of the load current. Under this condition, should the power source 2 be deactivated, the load is not affected because power source 1 still supplies output current to the load. On the other hand, should the power source 1 be deactivated, power source 2 starts supplying current to the load. Thus, in both cases, the load is constantly supplied with load current.

As is clear from the above description, the parallel power source diode matching system of the prior art is advantageous in that the number of components required is relatively small, and accordingly the arrangement is simple. However, the operation of the parallel power source diode matching system is disadvantageous for the following reasons:

(1) In practice, the difference between the output voltages of the parallel power sources will never become zero. Therefore, it is difficult to maintain load balance between the power sources; that is, the load current is always supplied by only one of the power sources. Accordingly, the temperature of the power source supplying the load current increases, such that the power source itself (and accordingly the power source system) is degraded in reliability. Since the reliability of the power source system depends upon the power source which supplies the load current, even if the number of power sources to be parallel-operated is increased, the reliability of the system is not improved.

(2) In the case where the parallel operation is carried out in order to increase the output capacity, the load balance is not sufficient to maintain both power sources in their conductive states. As a result, the load current is supplied by only one of the power sources, and it becomes necessary to increase the capacity of the transistor which forms the power source. Thus, it is impossible to decrease the capacity of the transistor by employing an over-current protection system which provides a particularly beneficial output voltage vs. load current characteristic for the power source.

(3) The load balance is insufficient (as described herein). Therefore, when the power sources switch such that a source which was previously non-conductive is rendered conductive, the output voltage drops significantly during the switch.

(4) Because of the characteristics of the matching diodes D1 and D2, the output voltage depend upon either the load current or the ambient temperature; that is, it is difficult to maintain the output voltage at a constant level with a high degree of accuracy.

(5) When the load current is high, the loss of electric power by the matching diodes D1 and D2 is high, and accordingly the efficiency is lowered.

FIG. 2 is a circuit diagram showing a second conventional power source system which is a so-called "master and slave system".

In FIG. 2, reference character M designates a master power source; S, a slave power source; Tr1 and Tr2, output voltage controlling transistors; A1 and A2, error amplifiers, ZD1, a Zener diode for supplying a reference voltage; and R14 and R24, output current detecting resistors.

The master power source M is an ordinary stabilized power source. In the master power source M, the conduction of the transistor Tr1 is controlled by the output of the error amplifier A1, such that a voltage applied to the inverting input terminal of the amplifier A1 (i.e., $Vc=R13\cdot EO/(R12+R13)$) is equal to a voltage applied to the noninverting input terminal (i.e., reference voltage $V_{ZD1}$), in order to maintain the output voltage EO constant.

On the other hand, in the slave power source S, the output of the error amplifier A2 is utilized to control the conduction of the transistor Tr2, so that a voltage applied to the noninverting input terminal of the amplifier A2 (i.e., the voltage at point b) is equal to a voltage applied to the inverting input terminal (i.e., the voltage at point a), which maintains the output voltage EO at a constant level. Therefore, when the voltage at point a is equal to that at point b, the following equation holds:

$$i2\cdot R24=i1\cdot R14 \quad (1)$$

where, i1 is the current supplied to the load from the master power source M, and i2 is the current supplied to the load from the slave power source S.

If R24=R14, then i2=i1. That is, the current supplied to the load by the master power source M is equal to the current supplied to the load by the slave power source S. Accordingly, many of the drawbacks accompanying the diode matching system described with reference to FIG. 1 are substantially eliminated by this prior art master and slave system. However, the master and slave system is disadvantageous for the following reasons:

(1) When a slave power source is deactivated, it is "backed up" (i.e. current is supplied) by either the other slave power sources or the master power source. However, when the master power source is deactivated, its slave power sources are also deactivated. Thus, the reliability of the power source system in which the the power sources are operated in a parallel mode depends upon the master power source. Accordingly, in such a system, an increase in the number of slave power sources can increase the output capacity, but cannot improve the reliability of the system.

(2) The master power source is different in circuit arrangement from the slave power sources. When comparaed to the case where the master and slave power sources are equivalent in circuit arrangement, the master and slave system is not suitable for mass production. Accordingly, it is difficult to reduce the manufacturing costs and to decrease the time expended for the maintenance of such a parallel power source configuration.

SUMMARY OF THE INVENTION

Accordingly, an object of the invention is to provide a stabilized power source parallel operation system in which the above-described difficulties are eliminated, the output capacity is increased, and the reliability is improved.

These and other objects of the invention are realized in a stabilized power source parallel operation system in which a plurality of stabilized power sources are connected in parallel to one another. Each power source of the invention comprises an error voltage detecting means for subjecting a reference voltage and an output voltage of a power source circuit to comparison for detecting an error voltage therebetween to be outputted as a current set value; an output current detecting means for detecting an output current of the power source circuit and for outputting a detection voltage corresponding to the output current thus detected; and a current adjusting means for adjusting an output current of the power source circuit so that the detection voltage of the output current detecting means is equal to the current set value. The outputs of the error voltage detecting means are connected together by a common bus to average the error voltages of the stabilized power sources.

BRIEF DESCRIPTION OF THE DRAWINGS

The structure and teaching of the present invention will become more apparent upon a detailed description of the preferred embodiment thereof. In the description to follow, reference will be made to the accompanying drawings, in which.

DETAILED DESCRIPTION OF THE PREFERRED EMBODIMENTS

Figure 3:
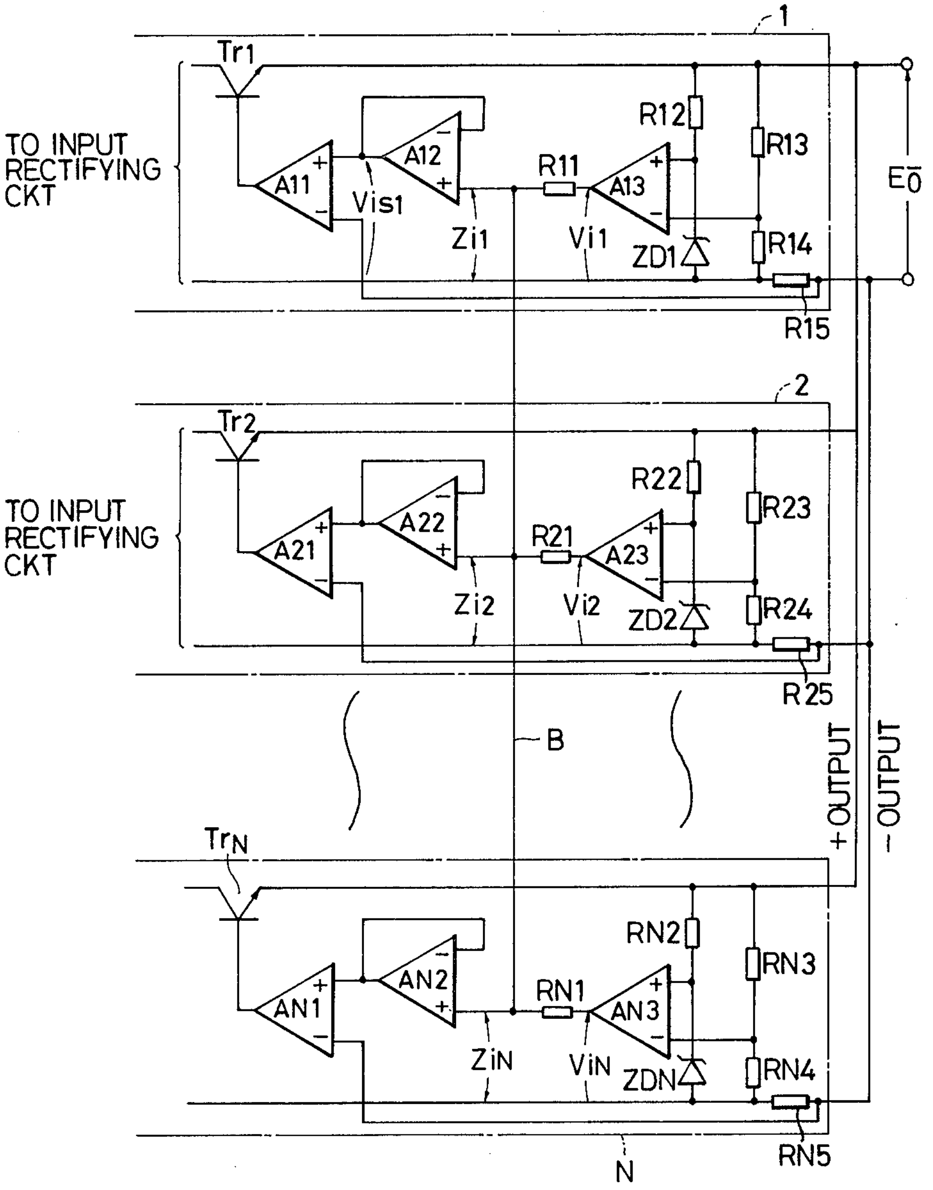
FIG. 3 is a circuit diagram illustrating the preferred embodiment of the invention.

The preferred embodiment of this invention will be described with reference to FIG. 3. In FIG. 3, reference characters 1, 2, . . . and N designate stabilized power sources having equivalent constructions. That is, FIG. 3 shows a parallel operation system of N power sources. The positive (+) outputs and the negative (−) outputs of the power sources are commonly connected, respectively. The power sources are also connected to one another by a common bus B. In the power source 1, reference character Tr1 designates an output voltage controlling transistor operable to control an output current $i_1$ to thereby control an output voltage EO; All, a current adjusting amplifier; A12, a voltage follower (which operates here as an impedance converter); A13, a voltage error amplifier; R11, a set current value mixing resistor; R15, an output current detecting resistor; and ZD1, a Zener diode for supplying a reference voltage.

The construction of the power sources 2 through N are identical to the above-described arrrangement of the power sources 1. In the case where an input impedance of the current error amplifier A11, A21, . . . , AN1 is much greater than the resistance of the set current value mixing resistor R11, R21, . . . , RN1, the provision of the voltage follower A12, A22, . . . , AN2, respectively, is unnecessary.

Figure 1:
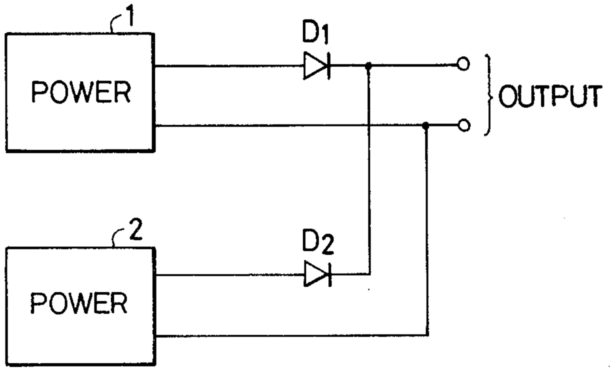
FIG. 1 PRIOR ART
FIG. 1 is a circuit diagram illustrating parallel power sources connected in the diode matching method of the prior art.
Figure 2:
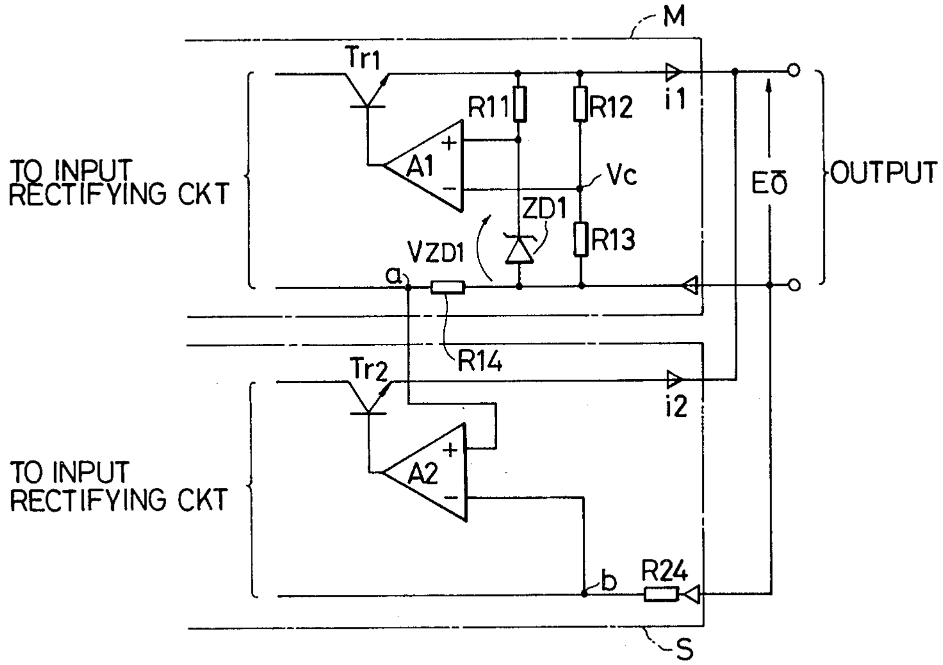
FIG. 2 PRIOR ART
FIG. 2 is a circuit diagram illustrating parallel power sources connected in the master-slave method of the prior art.

When only one of the power sources (power source 1, for example) is operated, its output $\overline{EO}$ can be represented by the following equation (similarly to the prior art system shown in FIG. 2):

$$\overline{EO} = \frac{R13 + R14}{R14} \times V_{ZD1} \tag{2}$$

where $V_{ZD1}$ is the Zener voltage of the diode ZD1.

If the output voltage is shifted from this value, an output voltage $V_{i1}$ corresponding to the voltage error is applied, as a current set value at an output terminal, to the current adjusting amplifier A11 through the voltage error amplifier A13, resistor R11 and voltage follower A12. As a current set value $V_{is1}$ as a set value of an output current changes by an amount equal to the output voltage error, the current adjusting amplifier A11 will control the transistor Tr1 such that the output current i1 of the power source, that is, a detection voltage i1R15 appearing across a resistor R15 coincides with the current set value $V_{is1}$. As a result, the voltage error (i.e., the difference between the output voltage and the reference voltage) is cancelled out as the output voltage EO is adjusted. In this case, a voltage drop appearing across the resistor R15, that is, the detected voltage i1R15 is within a range between several tens and 100 mV. This is sufficiently small when compared with the output voltage EO and the output voltage error and therefore it is possible to ignore an undesired effect to the detection value of the output voltage EO, which is caused by the voltage drop.

Now, let us consider the case where N power sources are connected in parallel as shown in FIG. 3. In the power sources, the translators Tr1, Tr2, . . . , and TrN are controlled such that currents equal to the current set values are applied to the positive (+) input terminals of the current adjusting amplifiers A11, A21, . . . , AN1, to adjust the output voltages, respectively. However, in the case where N power sources are operated in a parallel mode, the current set values applied to the current error amplifiers of the power sources are different from those produced during the operation of a single power source. These current set values are obtained by mixing an averaging the current set values of the power sources via the current set value mixing resistors R11, R21, . . . and RN1 which are connected together by the common bus B.

If the current set values at an output terminal in the power sources are represented by $V_{i1}$, $V_{i2}$, . . . and $V_{iN}$ and the input impedances of the voltage followers are represented by $Z_{i1}$, $Z_{i2}$, . . . and $Z_{iN}$, the current set value $V_{is1}$ at an input terminal which is inputted to the current adjusting amplifier A11 of the power source 1 is defined by the equation:

$$V_{is1} = \frac{R21//R31//\ldots//RN1//Z_i}{R21//R31//\ldots//RN1//Z_i + R11} \cdot V_{i1} + \tag{3}$$

-continued $$\frac{R11//R31//\ldots//RN1//Z_i}{R11//R31//\ldots//RN1//Z_i + R21} \cdot V_{i2} + \ldots + \frac{R11//R21//\ldots//R(N-1)1//Z_i}{R11//R21//\ldots//R(N-1)\cdot//Z_i + RN1} \cdot V_{iN}$$

where $Z_i = Z_{i1}//Z_{12}//\ldots//Z_{iN}$.

In general, R1/ /R2 means $$\left(\frac{1}{\frac{1}{R_1} + \frac{1}{R_2}}\right).$$

Equation (3) can be calculated according to the principle of superposition. The process of calculation will not be described herein due to its length and intricacy, but is well known by those skilled in the art.

If R11=R21= . . . =RN1=R, and if the input impedance of each of the voltage followers A12, A22, . . . and AN2 is much higher than the resistance R, then the abovedescribed equation can be rewritten as follows:

$$V_{is1} = \frac{1}{N}(V_{i1} + V_{i2} + \ldots + V_{iN}) \quad (4)$$

Thus, the current set value at an input terminal of the power source 1 is the average of the current set values at output terminals of the power sources. Further, since the current set value of each of the power sources 2 through N is equal to the current set value $V_{is1}$ at an input terminal of the power source 1, the loads of the power sources are in balance. Accordingly, the temperature rise in each of the power sources is the same. Moreover, the temperature rises are small when compared with those in the diode matching system. Thus, the parallel operation system of the invention has a greater degree of reliability.

If the sum of the output currents in the parallel operation of N power sources is represented by I, then the output of each power source is I/N. When one of the N power sources is deactivated, each of the remaining (N−1) power sources increases its output current as much as I/N(N−1) to compensate for the output of the power source which has been deactivated. Accordingly, if the output of each of the power sources is, $$\frac{I}{N} + \frac{I}{N(N-1)} = \frac{N(N-1)+1}{N(N-1)} \quad (5)$$

then one power source can be "backed up" by the others when it is deactivated. If the number (N) of power sources which are operated in a parallel mode is further increased, a highly reliable power source system is produced. Even if a plurality of power sources are deactivated, the deactivated power sources can be "backed up" by the remaining power sources.

In the case where it is unnecessary to back up a power source or power sources which are stopped, the power source system can provide the maximum output N×i (where i is the output capacity per power source). As such, the output capacity of the power source system can be increased by adding as many power sources as required. Further, it is also possible to increase the output capacity of the power source system having a back-up function as previously described.

As is apparent from the above description, according to the system of the invention, a plurality of power sources of identical circuitry are operated in the parallel mode such that the reliability of the power source system is improved and the output capacity is increased. The invention eliminates the difficulties accompanying both the conventional diode matching system and the master and slave system of the prior art.

The technical concept of the invention can be applied to a switching regulator as well as the abovedescribed series regulator.

What is claimed is:

1. A stabilized power source parallel operation system comprising a plurality of stabilized power sources connected in parallel to one another, each of said power sources producing an output voltage and an output current, each of said sources comprising:

an error voltage detecting means for comparing a reference voltage and said output voltage and outputting an error voltage indicative of a difference therebetween;

an output current detecting means for detecting an output current of said power source and for outputting an detection voltage corresponding to the output current thus detected;

a current adjusting means for adjusting an output current of said power source so that the detection voltage of said output current detecting means is equal to the current set value; and a common bus means for interconnecting the outputs of said error voltage detecting means of each of said power sources, said error voltages thereof being combined in said bus to produce an averaged current set value for setting each of said current set values of said power sources.

2. The stabilized power source parallel operating system as recited in claim 1 wherein said output current detecting means comprises a mixing resistor which is connected between said error voltage detecting means and said common bus means, and a voltage follower connected between said bus means and said current adjusting means.

3. The stabilized power source parallel operating system as recited in claim 2, wherein said average current set value $V_{isN}$ for an Nth of said power sources is defined by the equation:

$$V_{isN} = \frac{R11//R21//\ldots//RN1//Z_i}{R11//R21//\ldots//RN1//Z_i + R11} \cdot V_{i1} + \frac{R11//R21//\ldots//RN1//Z_i}{R11//R21//\ldots//RN1//Z_i + R21} \cdot V_{i2} + \ldots + \frac{R11//R21//\ldots//R(N-1)1//Z_i}{R11//R21//\ldots//R(N-1)1//Z_i + RN1} \cdot V_{iN}$$

where R11, R21, . . . RN1 are the resistances of the mixing resistors of each of the first, second, . . . Nth power sources respectively, $Z_i = (Z_{i1}//Z_{i2}//\ldots Z_{iN})$ is the combined input impedance of the voltage followers of all of the first, second, . . . Nth power sources, and $V_{i1}$, $V_{i2}$, . . . $V_{iN}$ are the error voltages of each of the first, second, . . . Nth power sources, respectively.

* * * * *